(12) United States Patent
Bossard

(10) Patent No.: US 8,580,451 B1
(45) Date of Patent: Nov. 12, 2013

(54) FUEL CELL SYSTEM AND METHOD OF OPERATION THAT RECYCLES WATER FROM THE FUEL PROCESSOR RAFFINATE OF A HYDROGEN SEPARATOR

(76) Inventor: Peter R. Bossard, Ivyland, PA (US)

( * ) Notice: Subject to any disclaimer, the term of this patent is extended or adjusted under 35 U.S.C. 154(b) by 822 days.

(21) Appl. No.: 12/123,273

(22) Filed: May 19, 2008

(51) Int. Cl.
*H01M 8/04* (2006.01)
*H01M 8/06* (2006.01)

(52) U.S. Cl.
USPC .......... 429/436; 429/408; 429/428; 429/433; 429/434

(58) Field of Classification Search
USPC .............. 429/19, 408, 428, 433, 434, 436
See application file for complete search history.

(56) References Cited

U.S. PATENT DOCUMENTS

| | | | |
|---|---|---|---|
| 6,783,750 B2 * | 8/2004 | Shah et al. | 423/652 |
| 2003/0190503 A1 * | 10/2003 | Kumar et al. | 429/17 |
| 2005/0008907 A1 * | 1/2005 | Isozaki et al. | 429/20 |
| 2005/0175870 A1 * | 8/2005 | Hagan et al. | 429/20 |

* cited by examiner

*Primary Examiner* — Sean P Cullen
(74) *Attorney, Agent, or Firm* — LaMorte & Associates, P.C.

(57) ABSTRACT

A power generation system and a fuel processor for use within a power generation system. A fuel processor is connected to both a fuel supply line and a water supply line. The fuel processor reacts the hydrocarbon fuel with the water to produce hydrogen gas and raffinate gases. The hydrogen gas is directed into a hydrogen gas line. The raffinate gases are directed into a raffinate gas line. A fuel cell is powered using the hydrogen gas. A heat exchanger is provided that exchanges heat between the fuel supply line, the water supply line, the hydrogen gas line and the raffinate gas line. This enables heat to be recycled. In addition the raffinate gases also travel into a water recovery subsystem. The water recovery subsystem condenses water out of the raffinate gases The recovered water is returned to the system.

19 Claims, 1 Drawing Sheet

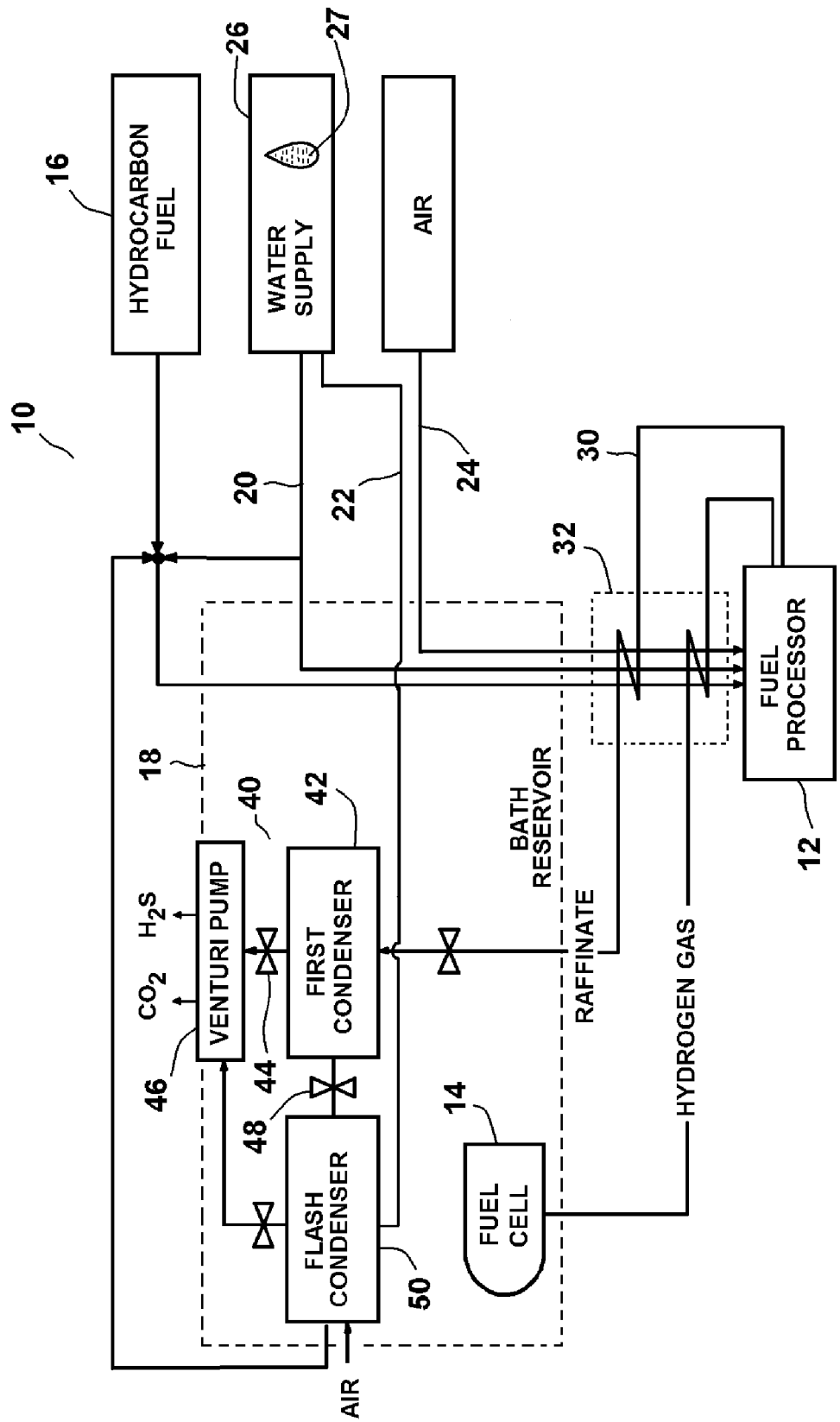

ature of the present invention is related
FUEL CELL SYSTEM AND METHOD OF OPERATION THAT RECYCLES WATER FROM THE FUEL PROCESSOR RAFFINATE OF A HYDROGEN SEPARATOR

BACKGROUND OF THE INVENTION

1. Field of the Invention

In general, the present invention relates to systems and methods that use a hydrogen separator to separate molecular hydrogen from a volume of a mixed gas for use in powering a fuel cell. More particularly, the present invention is related to systems and methods that process the raffinate output of a hydrogen separator.

2. Prior Art Description

In industry, there are many applications for the use of ultra pure molecular hydrogen. For instance, there are many fuel cells that operate using hydrogen. The hydrogen, however, must be ultra pure. Any molecules of carbon dioxide, carbon monoxide or other contaminant gases that are received by the fuel cell causes damage to the fuel cell and decreases both the efficiency and the functional life of the fuel cell.

Commonly, purified hydrogen for use by a fuel cell is generated using a two stage process. In the first stage, hydrogen gas is separated from a source gas. For example, hydrogen can be separated from a hydrocarbon gas. However, in many common processes that produce hydrogen, the hydrogen gas produced is not pure. Rather, when hydrogen is produced, the resultant gas is often contaminated with hydrocarbons and/or other contaminants. It is for this reason that a second processing stage is used.

In the second processing stage, the separated hydrogen gas is then purified to remove lingering contaminants. In the art, ultra pure hydrogen is commonly considered to be hydrogen having purity levels of at least 99.999%. In the prior art, one of the most common ways to purify contaminated hydrogen gas is to pass the gas through a hydrogen separator. A hydrogen separator has a membrane made of a hydrogen permeable material, such as palladium or a palladium alloy. As the contaminated hydrogen gas is exposed to the membrane, atomic hydrogen permeates through the membrane, thereby separating from the contaminants. At the surface of the membrane, molecular hydrogen disassociates into atomic hydrogen. The membrane absorbs the atomic hydrogen. The atomic hydrogen permeates through the membrane from a high pressure side of the membrane to a low pressure side of the membrane. Once at the low pressure side of the membrane, the atomic hydrogen recombines to form molecular hydrogen.

The gases that do not pass through the membrane are commonly considered waste and are vented. However, in certain fuel cell systems, the waste raffinate gases created by a hydrogen separator contain both heat and water that can be reclaimed. The problem is that the raffinate gases may also contain sulfur compounds that must be separated from any water that is reclaimed.

A need therefore exists for a way to remove sulfur compounds from the raffinate gases of a hydrogen separator so that the heat and water contained in those raffinate gases can be reclaimed. This need is met by the present invention as described and claimed below.

SUMMARY OF THE INVENTION

The present invention is a power generation system and its corresponding method of operation. The system has a fuel supply line for carrying a hydrocarbon fuel with a sulfur component, such as diesel fuel. Water is supplied through a water supply line. A fuel processor is connected to both the fuel supply line and the water supply line. The fuel processor reacts the hydrocarbon fuel with the water to produce hydrogen gas and raffinate gases. The hydrogen gas that is produced is directed into a hydrogen gas line. The raffinate gases that are produced are directed into a raffinate gas line. The raffinate gases contain sufur compounds, such as hydrogen sulfide.

A fuel cell is powered using the hydrogen gas supplied through the hydrogen gas line. A heat exchanger is provided that exchanges heat between said fuel supply line, said water supply line, said hydrogen line and said raffinate gas line. This enables heat to be recycled into the system.

In addition to having heat reclaimed from the raffinate gases, the raffinate gases also travel into a water recovery subsystem. The water recovery subsystem condenses water out of the raffinate gases, thereby separating the water from most of the sulfur compounds. The water recovery subsystem also reduces the pressure of the raffinate gases to ambient. The recovered water is returned to the system. Waste gases that contain sulfur compounds are vented.

The result is a highly efficient system where little or no useful material or energy is wasted on vented gases.

BRIEF DESCRIPTION OF THE DRAWINGS

For a better understanding of the present invention, reference is made to the following description of an exemplary embodiment thereof, considered in conjunction with the accompanying drawing, in which:

FIG. 1 is a schematic of an exemplary embodiment of a power generating system containing a heat and water recovery subsystem in accordance with the present invention.

DETAILED DESCRIPTION OF THE DRAWINGS

Referring to FIG. 1, there is shown a schematic of an exemplary embodiment of a power generation system 10 that contains a fuel processor 12 and a fuel cell 14. The fuel processor 12 converts a hydrocarbon fuel 16 into ultra pure hydrogen that is then used to run the fuel cell 14.

The fuel cell 14 receives ultra pure hydrogen from the fuel processor 12 and produces electricity. There are several prior art fuel cell designs that require ultra pure hydrogen for proper operation. Any such fuel cell can be adapted for use as part of the overall power generation system 10.

The fuel cell 14 produces heat as it operates. The heat of the fuel cell 14 is used to heat a bath reservoir 18. In operation, the bath reservoir 18 is maintained at approximately 80-degrees Celsius by the fuel cell 14.

The fuel cell 14 requires a supply of hydrogen gas. The hydrogen gas is provided by the fuel processor 12. The fuel processor 12 receives a hydrocarbon fuel through a fuel supply line 20. The fuel processor 12 removes hydrogen from the hydrocarbon fuel 16. Appropriate hydrocarbon fuels would include, but are not limited to, diesel fuel and gasoline. Such hydrocarbon fuels contain sulfur.

A water supply 26 is provided. The water supply 26 feeds water 27 to the fuel processor 12 through a water supply line 22. The water 27 in the water supply 26 is replenished by the power generation system 10 as will later be explained.

As the hydrocarbon fuel 16 and water 27 are received by the fuel processor 12, the hydrocarbon fuel 16 and water 27 are caused to react in a gas-shift phase reaction as represented by Equation 1 below. The reaction occurs between 650° C. and 800° C. This temperature range is maintained by combustion within the fuel processor 12. Accordingly, the fuel processor 12 also receives air through an air supply line 24. In this temperature range, the water ($H_2O$) is vapor. Furthermore, any complex hydrocarbons present in the hydrocarbon fuel 16 break apart into simpler molecules. These simpler molecules react with the water vapor as expressed in Equation 1 below.

$$C(n)H(m)+2(n)H_2O \rightarrow (n)CO_2+[2(n)+(m/2)]H_2 \quad \text{Equation 1}$$

Using real numbers, assume the primary hydrocarbon in the hydrocarbon fuel 16 is $C_8H_{18}$, such as the case with diesel fuel. Using Equation 1, the following reaction occurs.

$$C_8H_{18}+16H_2O \rightarrow 8CO_2+25H_2$$

It can therefore be seen that by combining the hydrocarbon fuel 16 with water vapor in a reaction chamber, a hydrocarbon containing only eighteen hydrogen atoms (H) results in reactant gases that include 25 free molecules of hydrogen gas ($H_2$).

The fuel processor 12 that reacts the hydrocarbon fuel 16 and water 27 can have different configurations. A preferred configurations of such fuel processors are disclosed in co-pending U.S. patent application Ser. No. 11/341,541, entitled System And Method For Processing Fuel For Use By A Fuel Cell Using A Micro-channel Catalytic Hydrogen Separator, filed Jan. 27, 2006. This co-pending application is by the current applicant and is herein incorporated into this specification by reference.

The fuel processor 12 receives hydrocarbon fuel 16 through the fuel supply line 20, water 27 through the water supply line 22 and air through the air supply line 24. The fuel processor 12 reacts the hydrocarbon fuel 16 with the water 27 to produce primarily hydrogen and carbon dioxide. However, depending upon the hydrocarbon fuel 16 being used, other compounds can also be produced. For instance, diesel fuel often contains trace amounts of sulfur.

The sulfur reacts with the hydrogen to produce $H_2S$.

The hydrogen gas produced by the fuel processor 12 is drawn out of the fuel processor 12 through a hydrogen output line 28. Remnant water vapor ($H_2O$) and all other byproduct gases, such as $CO_2$ and $H_2S$, produced by the fuel processor 12 pass into a raffinate output line 30.

The gases in the raffinate output line 30 are hot. Much of this heat can be recycled. A heat exchanger 32 is provided. The fuel supply line 20, water supply line 22, air supply line 24, raffinate output line 30 and hydrogen output line 28 all pass through the heat exchanger 32. The raffinate gases in the raffinate output line 30 and the hydrogen in the hydrogen output line 28 are at the operating temperature of the fuel processor 12. The fuel, water and air entering through the fuel supply line 20, water supply line 22, and air supply line 24, respectively, are relatively cold, being at ambient temperature. The fuel, water and air can be preheated to 80-degrees Celsius by passing the fuel supply line 20, water supply line 22, and air supply line 24 through the bath reservoir 18. Utilizing the heat exchanger 32, the temperature of the incoming fuel, water and air can be raised to a degree much closer to the temperature of the fuel processor 12, while the temperature of the outgoing hydrogen gas and raffinate gases can be significantly lowered.

Once the raffinate gases in the raffinate output line 30 are cooled by the heat exchanger 32, the raffinate output line 30 passes into the bath reservoir 18. The bath reservoir 18 further cools the raffinate gases to approximately 80-degrees Celsius. The cooled raffinate gases pass into a water recovery subsystem 40. The raffinate gases entering the water recovery subsystem 40 are typically at a pressure of between seven and fourteen atmospheres. This high pressure raffinate is passed into a first condenser 42. The first condenser 42 condenses much of the water vapor contained in the raffinate, however, waste gases such as $CO_2$ and $H_2S$ are not condensed. The waste gases that separate from the condensed water are forwarded through a back pressure regulator 44 to a venturi pump 46. The venturi pump 46 vents the waste gases into the ambient atmosphere.

The water condensed in the first condenser 42 still contains dissolved traces of $CO_2$ and $H_2S$. The contaminated water is passed through a water leveling release valve 48 into a flash condenser 50. The flash condenser 50 is maintained at ambient pressure, i.e. one atmosphere. At the lower pressure, more waste gases separate from the water. Air is introduced into the flash condenser 50. The air flushes the flash condenser 50 and sweeps the waste gases to the venturi pump 46. Again the waste gases are vented into the surrounding environment. The water recovered from the flash condenser 50 can then be returned to the water supply 26.

It will be understood that the embodiment of the power generation system that is shown is merely exemplary and that a person skilled in the art can make many changes using functionally equivalent configurations. All such variations, modifications and alternate embodiments are intended to be included within the present invention as defined by the claims.

What is claimed is:

1. In a fuel cell power system having a fuel processor that supplies hydrogen gas to said fuel cell, wherein said fuel processor produces raffinate gases that include water in the form of water vapor and waste gases, a system for recovering said water, comprising:
   a first condenser for condensing said water vapor into water at a first pressure;
   a flash condenser that receives said water from said first condenser, wherein said flash condenser operates at ambient pressure; and
   a vent coupled to both said first condenser and said flash condenser for venting waste gases separated from said water.

2. The system according to claim 1, further including a venturi pump disposed between said vent and both said first condenser and said flash condenser.

3. The system according to claim 2, further including a back pressure regulator disposed between said first condenser and said venturi pump.

4. The system according to claim 1, wherein said flash condenser is flushed with air at ambient pressure.

5. The system according to claim 1, wherein said first condenser and said flash condenser are cooled by a common bath reservoir.

6. A power generation system, comprising;
   a fuel supply line for carrying a hydrocarbon fuel;
   a water supply line for carrying water;
   a fuel processor connected to said fuel supply line and said water supply line, wherein said fuel processor reacts said hydrocarbon fuel with said water to produce hydrogen gas and raffinate gases, and wherein said raffinate gases leave said fuel processor through a raffinate gas line;
   a fuel cell for producing electricity from said hydrogen gas, wherein said fuel cell receives said hydrogen gas from said fuel processor through a hydrogen gas line; and
   a heat exchanger, wherein said fuel supply line, said water supply line, said hydrogen gas line and said raffinate gas line pass through said heat exchanger without mixing so that heat is exchanged between said fuel supply line, said water supply line, said hydrogen gas line and said raffinate gas line within said heat exchanger.

7. The system according to claim 6, wherein said raffinate gases include water vapor and waste gases, and wherein said system further includes a water recovery subsystem recovering water from said raffinate gases.

8. The system according to claim 7, wherein said water recovery subsystem includes a first condenser for condensing said water vapor into water.

9. The system according to claim 8, wherein said water recovery subsystem further includes a flash condenser coupled to said first condenser.

10. The system according to claim 9, wherein said first condenser and said flash condenser are both coupled to a venturi pump.

11. The system according to claim 9, wherein said flash condenser operates at ambient pressure.

12. The system according to claim 9, further including a bath reservoir primarily heated by said fuel cell.

13. The system according to claim 12, wherein said bath reservoir preheats said fuel supply line and said water supply line prior to said fuel supply line and said water supply line reaching said heat exchanger.

14. The system according to claim 9, wherein said first condenser and said flash condenser are cooled by said bath reservoir.

15. A method of operating a power generation system, comprising the steps of:
 providing a hydrocarbon fuel that is supplied to said power generation system through a fuel supply line;
 providing water that is supplied to said power generation system through a water supply line;
 providing a fuel processor connected to said fuel supply line and said water supply line, wherein said fuel processor reacts said hydrocarbon fuel with said water to produce hydrogen gas and raffinate gases, and wherein said raffinate gases leave said fuel processor through a raffinate gas line;
 providing a fuel cell for producing electricity from said hydrogen gas, wherein said fuel cell receives hydrogen gas from said fuel processor through a hydrogen gas line; and
 providing a heat exchanger that receives said fuel supply line, said water supply line, said hydrogen gas line and said raffinate gas line, therein exchanging heat between said fuel supply line, said water supply line, said hydrogen gas line and said raffinate gas line without mixing content between said fuel supply line, said water supply line, said hydrogen gas line and said raffinate gas line.

16. The method according to claim 15, wherein said raffinate gases include water, in the form of water vapor, and waste gases, and wherein said method further includes recovering said water from said raffinate gases.

17. The method according to claim 16, wherein said step of exchanging heat between said fuel supply line, said water supply line, said hydrogen gas line and said raffinate gas line, includes passing said fuel supply line, said water supply line, said hydrogen gas line and said raffinate gas line through a common heat exchanger.

18. The method according to claim 15, further including the step of providing a bath reservoir that is primarily heated by said fuel cell.

19. The method according to claim 18, further including the step of preheating said fuel supply line and said water supply line with said bath reservoir.

* * * * *